US010717539B2

(12) United States Patent
Menheere

(10) Patent No.: US 10,717,539 B2
(45) Date of Patent: Jul. 21, 2020

(54) HYBRID GAS-ELECTRIC TURBINE ENGINE

(71) Applicant: PRATT & WHITNEY CANADA CORP., Longueuil (CA)

(72) Inventor: David H. Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 273 days.

(21) Appl. No.: 15/147,284

(22) Filed: May 5, 2016

(65) Prior Publication Data

US 2017/0320584 A1 Nov. 9, 2017

(51) Int. Cl.

| | |
|---|---|
| *B64D 27/10* | (2006.01) |
| *F02C 7/275* | (2006.01) |
| *F02C 7/32* | (2006.01) |
| *F02C 6/20* | (2006.01) |
| *B64D 27/24* | (2006.01) |
| *B64D 41/00* | (2006.01) |

(Continued)

(52) U.S. Cl.
CPC ............ *B64D 27/10* (2013.01); *B64D 27/24* (2013.01); *B64D 41/00* (2013.01); *F02C 3/10* (2013.01); *F02C 3/145* (2013.01); *F02C 6/206* (2013.01); *F02C 7/275* (2013.01); *F02C 7/32* (2013.01); *H02K 7/116* (2013.01); *H02K 7/118* (2013.01); *H02K 7/1807* (2013.01); *H02K 16/02* (2013.01); *B64D 2027/026* (2013.01); *F05D 2220/325* (2013.01); *F05D 2220/76* (2013.01); *H02K 7/14* (2013.01); *H02K 7/1823* (2013.01)

(58) Field of Classification Search
CPC ...... B60W 10/08; Y02T 10/7077; B60K 6/48; B64D 27/10; B64D 27/24; B64D 41/00; F02C 3/10; F02C 3/145; F02C 6/206; F02C 7/275; F02C 7/32; H02K 7/1807; H02K 16/02; H02K 7/116; H02K 7/118; H02K 7/1185
USPC ..................................................... 290/45, 43
See application file for complete search history.

(56) References Cited

U.S. PATENT DOCUMENTS

| | | | |
|---|---|---|---|
| 5,201,798 A * | 4/1993 | Hogan | ................... B64D 41/00 60/39.15 |
| 6,732,529 B2 * | 5/2004 | Anderson | ............... F02C 7/268 192/21.5 |

(Continued)

OTHER PUBLICATIONS

Chad Campbell, et al., Design of a Hybrid Electrical Propulsion System, 19th ASC Structures, Structural Dynamics and Materials Conference, Apr. 7, 2011, pp. 1-10, American Institute of Aeronautics and Astronautics, Inc., Denver, Colorado.

(Continued)

*Primary Examiner* — Charles Reid, Jr.
(74) *Attorney, Agent, or Firm* — Norton Rose Fulbright Canada LLP

(57) ABSTRACT

A hybrid gas-electric turbine engine for turboprop or turboshaft applications is disclosed together with associated methods. In various embodiments disclosed herein, the turbine engine comprises a turbine configured to be driven by a flow of combustion gas; a turbine shaft configured to be driven by the turbine and transfer power to a load coupled to the turbine engine and an electric motor configured to transfer power to the load coupled to the turbine engine. The rotor may have a rotor axis of rotation that is radially offset from a shaft axis of rotation of the turbine shaft. In some embodiments, the electric motor may be a multi-rotor electric motor.

15 Claims, 3 Drawing Sheets

(51) Int. Cl.
*F02C 3/10* (2006.01)
*F02C 3/14* (2006.01)
*H02K 7/116* (2006.01)
*H02K 7/118* (2006.01)
*H02K 7/18* (2006.01)
*H02K 16/02* (2006.01)
*H02K 7/14* (2006.01)
*B64D 27/02* (2006.01)

(56) References Cited

U.S. PATENT DOCUMENTS

| | | | | |
|---|---|---|---|---|
| 6,735,954 B2* | 5/2004 | MacFarlane | ............ | F02C 6/206 60/793 |
| 7,144,349 B2* | 12/2006 | Mitrovic | ................ | B64D 35/00 475/331 |
| 7,451,753 B2* | 11/2008 | Bell | ........................ | F02C 7/224 123/196 R |
| 7,495,361 B2* | 2/2009 | Brouillet | ................ | F01D 15/10 310/118 |
| 7,555,893 B2 | 7/2009 | Okai | | |
| 7,621,117 B2* | 11/2009 | Dooley | ................... | F01D 15/10 60/226.1 |
| 7,802,757 B2 | 9/2010 | Dooley | | |
| 8,169,100 B2* | 5/2012 | Dooley | ................... | F02C 7/275 123/198 R |
| 8,232,700 B2 | 7/2012 | Dooley | | |
| 8,278,774 B2* | 10/2012 | Macchia | ................. | F01D 15/10 290/52 |
| 8,461,704 B2 | 6/2013 | McLoughlin | | |
| 2005/0132693 A1* | 6/2005 | Macfarlane | ............. | F01D 25/18 60/39.08 |
| 2007/0246302 A1* | 10/2007 | Bell | ........................ | F01D 25/20 184/6.11 |
| 2012/0167551 A1 | 7/2012 | Lugg | | |
| 2016/0023773 A1 | 1/2016 | Himmelmann | | |
| 2016/0097328 A1* | 4/2016 | Wintgens | .................. | F02C 7/32 415/1 |
| 2017/0211477 A1* | 7/2017 | Menheere | ................. | F02C 7/06 |

OTHER PUBLICATIONS

Canadian Intellectual Property Office, Office Action dated Apr. 5, 2018 re: Canadian patent application No. 2,963,776.

Norton Rose Fulbright Canada LLP; Response dated Sep. 27, 2018 to Office Action dated Apr. 5, 2018 re: Canadian patent application No. 2,963,776.

* cited by examiner

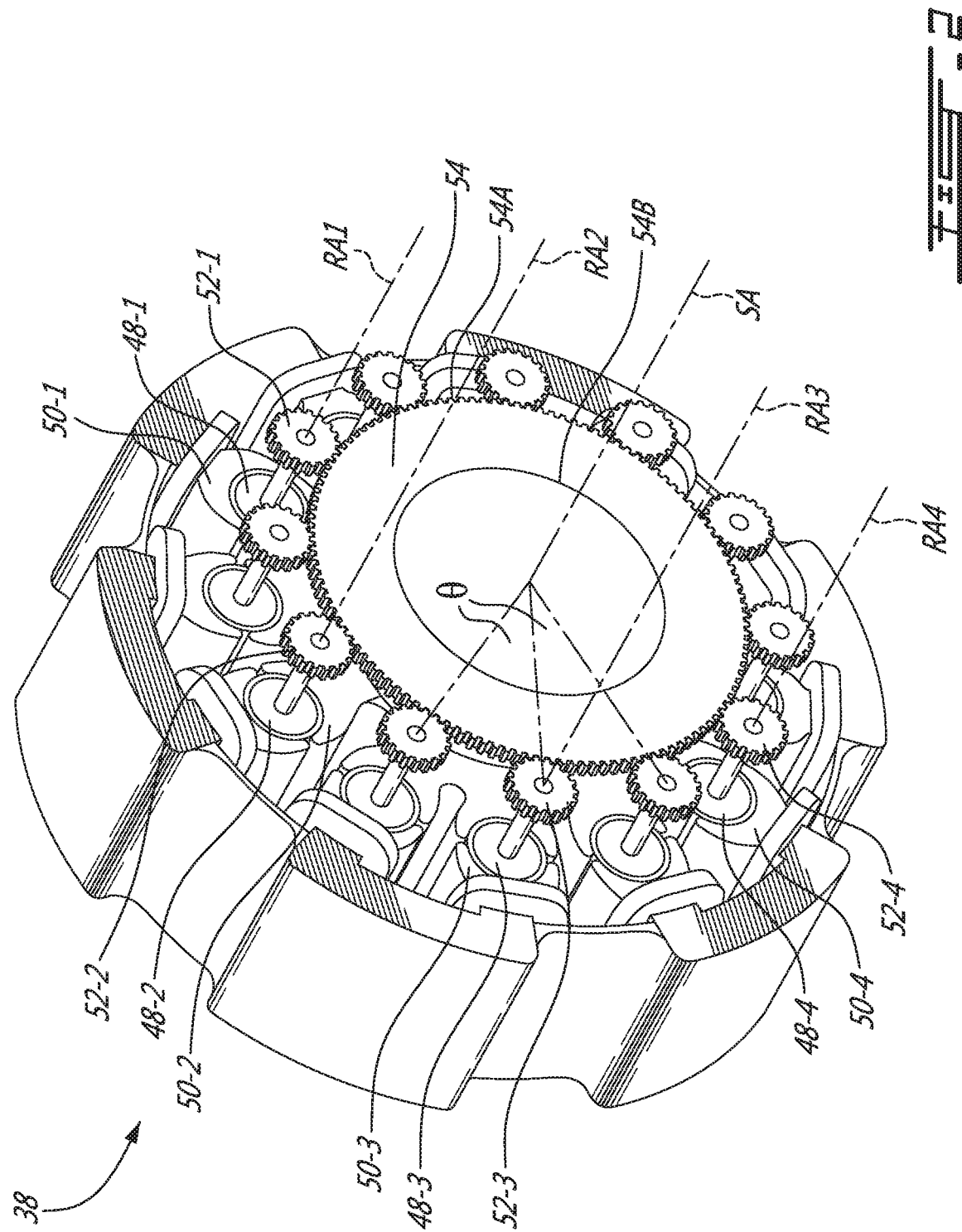

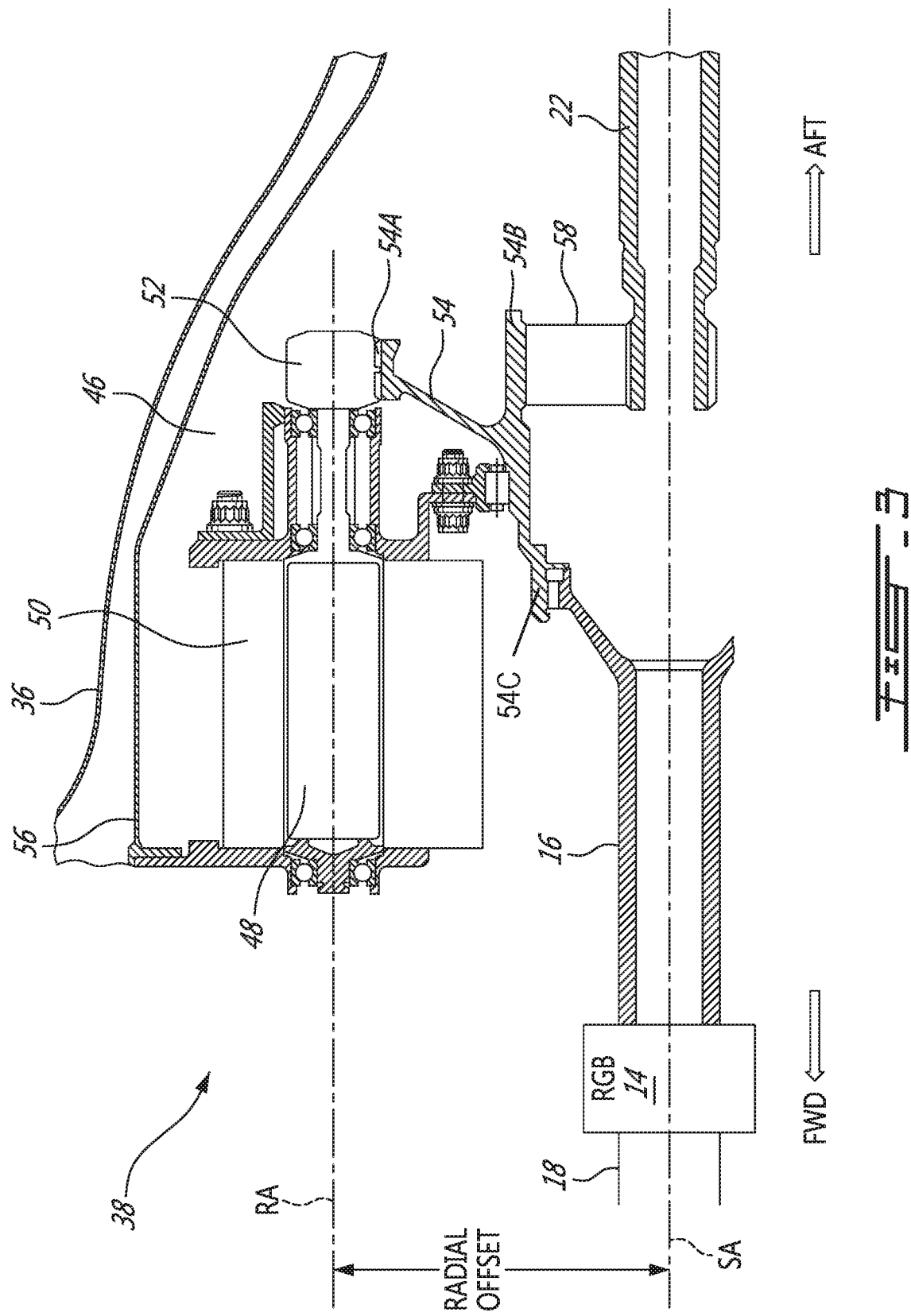

HYBRID GAS-ELECTRIC TURBINE ENGINE

TECHNICAL FIELD

The disclosure relates generally to turbine engines, and more particularly to hybrid gas-electric turbine engines for turboprop and turboshaft applications.

BACKGROUND OF THE ART

Hybrid (gas-electric) automobiles have become an alternative to automobiles that are powered exclusively by gasoline. The use of hybrid power plants in automobiles has been shown to provide operational advantages such as improved fuel economy, reduced noise and reduced emissions. However, hybrid power plants for propelling aircraft have not yet reached widespread use.

SUMMARY

In one aspect, the disclosure describes a hybrid gas-electric turbine engine for turboprop or turboshaft applications. The turbine engine comprises:

a turbine configured to be driven by a flow of combustion gas;

a turbine shaft configured to be driven by the turbine and transfer power to a load coupled to the turbine engine, the turbine shaft having a shaft axis of rotation; and an electric motor configured to transfer power to the load coupled to the turbine engine, the electric motor comprising a stator and a rotor, the rotor having a rotor axis of rotation that is radially offset from the shaft axis of rotation.

Further details of these and other aspects of the subject matter of this application will be apparent from the detailed description and drawings included below.

DESCRIPTION OF THE DRAWINGS

Reference is now made to the accompanying drawings, in which:

FIG. 2 is a schematic perspective view of an exemplary electric motor of the hybrid turbine engine of FIG. 1; and FIG. 3 is a schematic enlarged axial cross-section view of the hybrid turbine engine of FIG. 1 in the area of the electric motor of FIG. 2.

DETAILED DESCRIPTION

Figure 1:
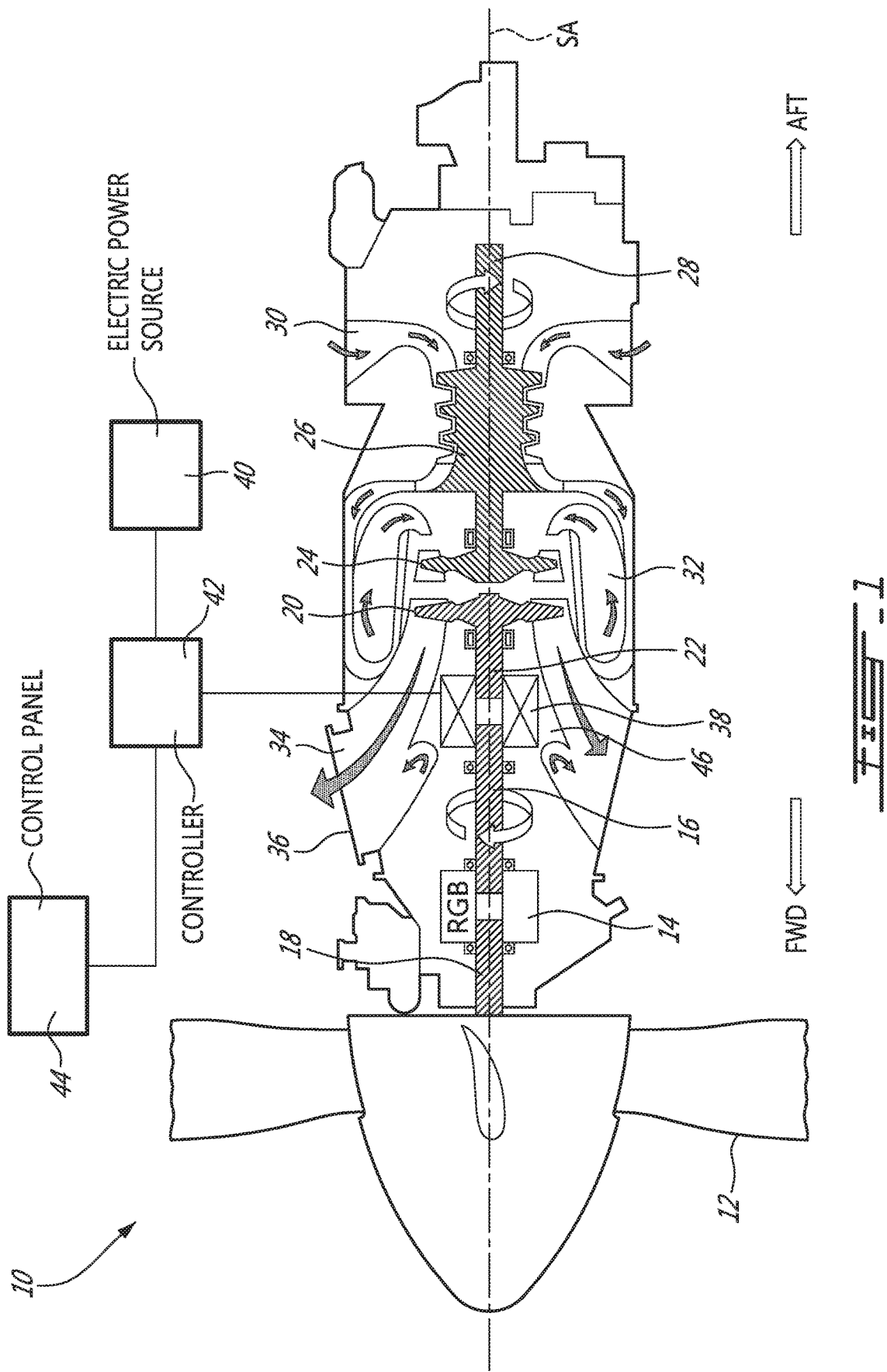
FIG. 1 is a schematic axial cross-section view of an exemplary hybrid gas/electric multi-spool turboprop turbine engine.

The present disclosure relates to hybrid gas-electric turbine engines. In various embodiments, aspects of the present disclosure may particularly useful for reverse-flow turboprop turbine engines for aircraft applications. In some embodiments, the present disclosure describes the physical integration of an (e.g., multi-rotor) electric motor into a reverse-flow turboprop engine configured as a parallel hybrid gas-electric propulsion system and associated methods of operation. However, aspects of the present disclosure may also be useful for other types of turbine engines including turboshaft turbine engines used in various applications such as aircraft (e.g., helicopter) or ground-based industrial applications such as power generation. In various embodiments, aspects of the present disclosure may be incorporated into new hybrid turbine engines or retrofitted into existing gas turbine engines to convert them to hybrid gas-electric turbine engines.

In some embodiments, hybrid gas-electric turbine engines as described herein may provide operational advantages over gas-only turbine engines. Such operational advantages may include: improved fuel economy, reduced noise and/or reduced emissions. In some embodiments, the physical integration of the electric motor as disclosed herein may result in weight savings and no significant increase in frontal area (i.e., drag) of the hybrid gas-electric turbine engines in comparison with similarly-configured gas-only turbine engines.

Aspects of various embodiments are described through reference to the drawings.

FIG. 1 is a schematic exemplary representation of an axial cross-section view of a hybrid gas/electric multi-spool turboprop turbine engine 10. Even though the following description and accompanying drawings specifically refer to a turboprop turbine engine as an example, it is understood that aspects of the present disclosure may be equally applicable to other types of turbine engines including turboshaft turbine engines. Hybrid turbine engine 10 may be of a type preferably provided for use in subsonic flight to drive a load such as propeller 12 via reduction gear box 14 (referred hereinafter as "RGB 14"). RGB 14 may be configured to transfer motive power from gearbox input shaft 16 to output shaft 18 coupled to propeller 12. RGB 14 may be of the speed-reducing type so that gearbox output shaft 18 may rotate at a rotational speed lower than a rotational speed of gearbox input shaft 16 and so that propeller 12 may be driven by output shaft 18 at a suitable speed. Power turbine 20 may provide rotational motive power to drive propeller 12 via turbine shaft 22 (i.e., low pressure shaft), gearbox input shaft 16, RGB 14 and gearbox output shaft 18. Hybrid turbine engine 10 may comprise a first spool comprising high pressure turbine 24, high pressure compressor 26 and high pressure shaft 28, and, a second spool comprising low pressure power turbine 20 mounted to power turbine shaft 22.

Power turbine shaft 22 may have shaft axis of rotation SA. In some embodiments, shaft axis of rotation SA may correspond to a longitudinal axis (e.g., central axis) of hybrid turbine engine 10. In some embodiments, shaft axis of rotation SA may correspond to an axis of rotation of propeller 12 and/or shaft axis of rotation SA may correspond to an axis of rotation of a low-pressure spool and/or a high-pressure spool of hybrid turbine engine 10.

Compressor 26 may draw ambient air into engine 10 via air inlet 30, increase the pressure of the drawn air and deliver the pressurized air to combustor 32 where the pressurized air is mixed with fuel and ignited for generating an annular stream of hot combustion gas(es) (referred hereinafter in the singular). High pressure turbine 24 may extract energy from the hot expanding combustion gas and thereby drive high pressure compressor 26. The hot combustion gas leaving high pressure turbine 24 may be accelerated as it further expands, flows through and drives power turbine 20. The combustion gas may then exit hybrid turbine engine 10 via exhaust outlet 34 defined by exhaust duct 36.

The first and second spools of hybrid turbine engine 10 may not be mechanically coupled together so that they may rotate at different speeds and/or in opposite directions. Also, the flow air through hybrid turbine engine 10 may be generally toward a forward direction (see "FWD" shown in FIG. 1) of hybrid turbine engine 10 where air inlet 30 may be disposed in a portion of hybrid turbine engine 10 aft (see "AFT" shown in FIG. 1) of combustor 32 and exhaust outlet 34 may be disposed in a portion of hybrid turbine engine 10 forward of combustor 32. The FWD direction illustrated in FIG. 1 may correspond to a direction of travel of hybrid turbine engine 10 when hybrid turbine engine 10 is mounted to an aircraft and configured as a turboprop engine. The exemplary configuration of hybrid turbine engine 10 shown in FIG. 1 may be referred to as a reverse-flow free turbine engine in relation to the general flow direction (in the FWD direction) in the gas path during gas operation of hybrid turbine engine 10. In some embodiments, hybrid turbine engine 10 may generally comprise a reverse-flow turboprop turbine engine of the "PT6" family (e.g., "PT6A") of engines produced by Pratt & Whitney Canada or the like, which has been configured for hybrid gas-electric operation in accordance with the present disclosure.

Hybrid turbine engine 10 may comprise electric motor 38 configured to transfer motive power to the load (e.g., propeller 12) coupled to hybrid turbine engine 10. In some embodiments, some characteristics of hybrid turbine engine 10 may be similar to the teachings of U.S. Pat. No. 7,802,757 entitled "METHOD AND SYSTEM FOR TAXIING AN AIRCRAFT", which is incorporated herein by reference.

Electric motor 38 may be selected to be sufficiently powerful to drive propeller 12 ether without using fuel in hybrid turbine engine 10 or with using a reduced amount of fuel by hybrid turbine engine 10 during at least one mode of operation of hybrid turbine engine 10. Electricity for driving electric motor 38 may be supplied by electric power source 40 under the control of controller 42. In various embodiments, electric power source 40 may, for example, include one or more batteries, an auxiliary power unit (APU) and/or an electric generator from another engine of the same aircraft onto which hybrid turbine engine 10 is mounted. In various embodiments, controller 42 may be configured to control the operation of electric motor 38 by providing suitable control signals to electric motor 38 and/or providing suitable conditioning of the electric power supplied to electric motor 38 by electric power source 40. In some embodiments, controller 42 may be configured to control the operation of electric motor 38 when electric motor 38 operates as a generator (e.g., to recharge battery(ies) 40) in at least one mode of operation of hybrid turbine engine 10. Electric motor 38 may be an electric machine configured to operate as a motor or as a generator. Controller 42 may actuate the amount of electric power supplied to electrical motor 38 in response to control signals it receives, such as for example, commands sent via a control interface (e.g., panel) 44 from a pilot of an aircraft to which hybrid turbine engine 10 is mounted. Controller 42 and electric power source 40 may be configured to supply enough electric power to electrical motor 38 in order to produce some or all of the torque required to rotate propeller 12 during at least one mode of operation of the aircraft.

Exhaust duct 36 may be configured to channel the flow of combustion gas downstream of turbine 20 axially (e.g., forward) and radially outwardly relative to shaft axis of rotation SA. An exterior of exhaust duct 36 may define a radially-inner space 46 that is radially converging in a first (e.g., aft) direction along shaft axis of rotation SA. In some embodiments, exhaust duct 36 or part(s) thereof may have a generally annular shape and therefore radially inner space 46 may have a generally conical shape where a larger diameter portion of the generally conical shape is disposed toward a forward direction along shaft axis of rotation SA and a smaller diameter portion of the generally conical shape is disposed toward an aft direction along shaft axis of rotation SA. In other words, exhaust duct 36 may define a radially-inner space having a diameter that progressively decreases in the aft direction along shaft axis of rotation SA.

Electric motor 38 may be at least partially disposed in the radially-inner space 46 defined by the exterior of exhaust duct 36 and radially converging in the aft direction as indicated in FIG. 1. As explained below, the configuration of electric motor 38 and the physical installation of electric motor 38 into hybrid turbine engine 10 may be tailored to make efficient use of the shape and volume of radially-inner space 46 defined by exhaust duct 36. In some embodiments, electric motor 38 may be disposed axially between RGB 14 and power turbine 20 along shaft axis of rotation SA. Due to the reverse-flow configuration of hybrid turbine engine 10, exhaust duct 36 may be disposed forward of air inlet 30 of hybrid turbine engine 10.

FIG. 2 is a schematic perspective view of an exemplary electric motor 38 of hybrid turbine engine 10. In various embodiments, electric motor 38 may be a single-rotor electric motor or a multi-rotor electric motor. In some embodiments, electric motor 38 may be a multi-rotor electric motor 38 of the type disclosed in U.S. Pat. No. 8,232,700 entitled "MULTI-ROTOR ELECTRIC MACHINE", which is incorporated herein by reference. In some embodiments, the use of a multi-rotor electric motor 38 as shown in FIG. 2 may provide a relatively high power to weight ratio and may be suitable for physical integration into a reverse-flow hybrid turbine engine 10 within inner space 46 defined by exhaust duct 36. In some embodiments, the integration (e.g., retrofitting) of electric motor 38 into an existing gas turbine engine may require an axial extension of such gas turbine engine depending on its existing configuration to provide a sufficiently large (e.g., long) inner space 46 to accommodate electric motor 38. In some embodiments, the integration of electric motor 38 may not require an increase in frontal area of the gas turbine engine and therefore may not cause a significant increase in drag. It is understood that electric motor 38 may be retrofitted into existing gas turbine engines so as to convert them to hybrid gas-electric, or, electric motor 38 may be integrated into new hybrid turbine engines.

Electric motor 38 may comprise one or more rotors 48-1 to 48-4 (referred generically as "rotor 48") and one or more respective stators 50-1 to 50-4 (referred generically as "stator 50"). In some embodiments, the plurality of rotor/stator pairs may be angularly distributed about shaft axis of rotation SA. In some embodiments, the plurality of rotor/stator pairs may be distributed about shaft axis of rotation SA at a substantially uniform angular spacing θ. One or more of rotors 48 may have a respective rotor axis of rotation RA1-RA4 (referred generically as "rotor axis of rotation RA") that is radially offset from shaft axis of rotation SA. In some embodiments, one or more rotor axes of rotation RA may be substantially parallel to shaft axis of rotation SA but not coaxial thereto. In some embodiments, each rotor axis of rotation RA may be radially offset from shaft axis of rotation SA at a substantially uniform offset distance. The structure and principle operation of multi-rotor motor 38 is described in U.S. Pat. No. 8,232,700 and is not repeated herein.

Each rotor 48 may be drivingly engaged (e.g., coupled via a shaft) to a respective drive gear 52-1 to 52-4 (referred generically as "drive gear 52") for transferring motive power from rotors 48 to propeller 12. Each drive gear 52 may be substantially coaxial with its respective rotor axis of rotation RA. Each drive gear 52 may be axially offset from its respective rotor 48 along shaft axis of rotation SA. In some embodiments, each drive gear 52 may be disposed aft of its respective rotor 48. In other words, each drive gear 52 may be disposed axially farther in the aft direction than its respective rotor 48. The larger overall diameter of electric motor 38 at an axial position of stator(s) 50 relative to the smaller overall diameter at an axial position of drive gear(s) 52 may permit an efficient use of the generally conical, radially-converging shape of inner space 46 defined by exhaust duct 36 and may thereby promote compactness. Accordingly, multi-rotor electric motor 38 and its physical integration into inner space 46 may, in some embodiments, provide advantages relating to packaging by making efficient use of the space available within hybrid turbine engine 10, and, provide a relatively high power density.

Electric motor 38 may be drivingly engaged to transmit and/or receive motive power to/from propeller 12 in any suitable known or other manner. In some embodiments electric motor 38 may be drivingly engaged to propeller 12 via: drive gears 52 drivingly engaged to respective rotors 48, common gear 54 drivingly engaged to drive gears 52, gearbox input shaft 16 drivingly engaged to common gear 54 via a second radially inner interface 54C of common gear 54 (see FIG. 3), and RGB 14 drivingly engaged to gearbox input shaft 16. RGB 14 may be drivingly engaged to transmit/receive motive power to/from propeller 12 via gearbox output shaft 18.

In embodiments where electric motor 38 comprise a plurality of rotors 48, each rotor 48 may be drivingly engaged to a single common gear 54 via respective drive gears 52 so that rotors 48 may cooperatively transfer power to or receive power from propeller 12 via common gear 54. Drive gears 52 and common gear 54 may be coupled (e.g., meshed) via radially outer interface 54A of common gear 54. Common gear 54 may be substantially coaxial with shaft axis of rotation SA. In some embodiments, common gear 54 may have a significantly larger diameter than the individual drive gears 52 and may accordingly may provide a speed-reducing function when transferring rotational motion from rotors 48 to gearbox input shaft 16. Conversely, the larger diameter of common gear 54 relative to the individual drive gears 52 may provide a speed-increasing function when transferring rotational motion from gearbox input shaft 16 to electric motor 38 when electric motor 38 is operating as a generator for example.

In some embodiments, the ratio of the rotational speed of drive gears 52 to common gear 54 may be up to about 10:1. In some embodiments, the ratio of the rotational speed of drive gears 52 to common gear 54 may be between about 3:1 and about 6:1. In some embodiments, the ratio of the rotational speed of drive gears 52 to common gear 54 may be between about 3:1 and about 5:1. In some embodiments, the ratio of the rotational speed of drive gears 52 to common gear 54 may be about 4:1. Drive gears 52 and common gear 54 may be sized appropriately so that the speed of common gear 54 may be relatively close to or substantially the same as the speed of turbine shaft 22 when gearbox input shaft 16 is driven via turbine shaft 22. Accordingly, the speed ratio may be selected based on the normal operating speed of turbine shaft 22. One some turbine engines, a typical operating speed of turbine shaft 22 may be between about 29,500 rpm to about 33,200 rpm. Permitting drive gear(s) 52 to rotate at a higher speed may permit the use of relatively high-speed electric motor 38 for increased power density. In various embodiments, drive gear(s) 52 may be driven at a speed between about 120,000 rpm and about 160,000 rpm and the speed ratio may be selected so that the rotational speed of common gear 54 may be between about 29,500 rpm to about 33,200 rpm. The coupling of electric motor 38 to propeller 12 via gearbox input shaft 16 instead of gearbox output shaft 18 may allow RGB 14 to provide further speed reduction and thereby allow for an even higher rotational speed of rotor(s) 48 of electric motor 38 relative to gearbox output shaft 18.

FIG. 3 is a schematic enlarged axial cross-section view of hybrid turbine engine 10 in the area of electric motor 38 where a single rotor/stator pair of multi-rotor electric motor 38 is shown. FIG. 3 shows the physical integration of electric motor 38 in hybrid turbine engine 10. Electric motor 38 may be housed in housing 56 and directly or indirectly secured to supporting structure (e.g., casing) of hybrid turbine engine 10 according to known or other methods. Rotor 48 may have rotor axis of rotation RA that is radially offset from shaft axis of rotation SA (see "RADIAL OFFSET" in FIG. 3).

Hybrid turbine engine 10 may be configured as parallel hybrid propulsion system comprising different modes of operation for electric motor 38 and turbine 20. In various modes of operation, electric motor 38 may either add power to propeller 12 by operating as a motor, or, electric motor 38 may receive power and operate as a generator to charge batteries which may be part of electric power source 40. Hybrid turbine engine 10 may be configured as a power assist system where propeller 12 is always powered by turbine 20, with electric motor 38 only providing a boost in power during certain phases of operation (e.g., flight). Alternatively, hybrid turbine engine 10 may be configured as a full hybrid system where propeller 12 may be driven exclusively from electric power source 40 via electric motor 38 in some phases of operation. With both types of systems, electric motor 38 can be used to provide power during a certain phase of operation and use excess power in another phase of operation (e.g. flight) to recharge batteries by operating as a generator. For example, in some embodiments, electric motor 38 may serve as backup for turbine 20 by providing redundancy during critical flight maneuvers such as but not limited to take-off, landings and hovering phases of aircraft, helicopters and vertical take-off and landing (VTOL) configurations.

In one mode of operation, electric motor 38 may work in conjunction with (i.e., supplement) turbine 22 to spin propeller 12. This mode of operation may, for example, correspond to a take-off phase of operation of an aircraft to which hybrid turbine engine 10 is mounted for example where a relatively large amount of power is required.

In another mode of operation, propeller 12 may be driven exclusively by a low pressure spool comprising turbine 20 where electric motor 38 may not provide any power to propeller 12. In this mode of operation, electric motor 38 may receive motive power from turbine 20 and function as an electric generator to recharge one or more batteries or serve as a source of electricity for powering other system(s) of hybrid turbine engine 10 or of an aircraft to which hybrid turbine engine 10 is mounted. This mode of operation may, for example, correspond to a cruise phase of flight of an aircraft to which hybrid turbine engine 10 is mounted for example. Alternatively, a relatively small amount of electric power could be controllably supplied to electric motor 38 in this mode of operation in order to keep electric motor 38 substantially freewheeling to reduce parasitic drag on turbine shaft 22.

In various modes of operation, electric motor 38 could be controlled so as to controllably apply parasitic drag on turbine shaft 22 to cause regenerative braking during descent for example and permit battery recharging.

In a hotel mode of operation, electric motor 38 could be controlled to apply a brake force on turbine shaft 22 to slow down or lock the rotation of propeller 12.

In another mode of operation, propeller 12 may be driven by a flow or ambient air during flight in a condition known as windmilling. In this mode of operation, electric motor 38 may receive motive power from propeller 12 and function as an electric generator to recharge one or more batteries or serve as a source of electricity for powering other system(s) of hybrid turbine engine 10 or of an aircraft to which hybrid turbine engine 10 is mounted.

In another mode of operation, propeller 12 may be driven exclusively by electric motor 38 (and electrical power source 40) so that the gas operation of hybrid turbine engine 10 may not be utilized. This mode of operation may, for example, correspond to a descent, landing and/or a taxiing phase of operation of an aircraft to which hybrid turbine engine 10 is mounted where reduced noise and/or fuel savings are desirable.

In various modes of operation, electric motor 38 may be permanently or selectively drivingly engaged to gearbox input shaft 16. For example, electric motor 38 may be permanently drivingly engaged to gearbox input shaft 16 via drive gear 52 and common gear 54 so that electric motor 38 may remain drivingly engaged to propeller 12 whether or not electric motor 38 is providing motive power to drive propeller 12.

Hybrid turbine engine 10 may comprise coupling device 58 of known or other type configured to drivingly engage and disengage turbine shaft 22 from gearbox input shaft 16. In various embodiments, coupling device 58 may comprise a suitable one-way rotation coupling device of known or other type such as, for example, a freewheeling (e.g., sprag, one-way) clutch. For example, coupling device 58 may be configured to transmit torque in one direction and allow idling (freewheel) in the opposite direction. For example, coupling device 58 may be configured to drivingly engage turbine shaft 22 to common gear 54 via inner interface 54B of common gear 54 when turbine 20 is used to drive propeller 12. Alternatively, when electric motor 38 is used to drive propeller 12 via drive gear(s) 52, common gear 54 and gearbox input shaft 16, coupling device 58 may permit common gear 54 to "freewheel" relative to turbine shaft 22. This arrangement may permit electric motor 38 to drive propeller 12 without the parasitic drag that could otherwise be associated with also driving turbine shaft 22 and power turbine 20 using electric motor 38.

Coupling device 58 may be configured to drivingly engage turbine shaft 22 to common gear 54 (e.g., via radially inner interface 54B) to transfer power from turbine shaft 22 to propeller 12 during a first mode of operation and drivingly disengage turbine shaft 22 from common gear 54 during a second mode of operation. Accordingly, turbine shaft 22 may be drivingly engaged to propeller 12 during the first mode of operation via: coupling device 58; common gear 54; gearbox input shaft 16 drivingly engaged to common gear 54; RGB 14 drivingly engaged to gearbox input shaft 16; and gearbox output shaft 18. As explained above, electric motor 38 may be configured to be drivingly engaged to common gear 54 (e.g., via radially outer interface 54A) during the first mode of operation and also during the second mode of operation.

The above description is meant to be exemplary only, and one skilled in the relevant arts will recognize that changes may be made to the embodiments described without departing from the scope of the invention disclosed. Also, one skilled in the relevant arts will appreciate that while the systems, devices and turbine engines disclosed and shown herein may comprise a specific number of elements/components, the systems, devices and turbine engines could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A hybrid gas-electric turbine engine for turboprop or turboshaft applications, the turbine engine comprising:
    a turbine configured to be driven by a flow of combustion gas;
    a turbine shaft configured to be driven by the turbine and transfer power to a load coupled to the turbine engine, the turbine shaft having a shaft axis of rotation;
    an electric motor configured to transfer power to the load coupled to the turbine engine, the electric motor comprising one or more stators and a plurality of rotors angularly distributed about the shaft axis of rotation, the rotors each having a rotor axis of rotation that is radially offset from the shaft axis of rotation;
    a respective drive gear drivingly engaged to each rotor for cooperatively transferring power from each rotor of the electric motor to the load; and
    a common gear that is substantially coaxial with the shaft axis of rotation and drivingly engaged to the load via a gearbox input shaft that is separate from the turbine shaft, the common gear having:
        a radially outer interface in driving engagement with the drive gears;
        a first radially inner interface drivingly engageable with the turbine shaft via a coupling device; and
        a second radially inner interface in driving engagement with the gearbox input shaft, the second radially inner interface axially spaced apart from the first radially inner interface,
    the coupling device configured to:
        drivingly engage the turbine shaft to the common gear to transfer power from the turbine shaft to the load during a first mode of operation; and
        drivingly disengage the turbine shaft from the common gear during a second mode of operation to permit the common gear to rotate separately from the turbine shaft when power is transferred from the electric motor to the load via the common gear.

2. The hybrid turbine engine as defined in claim 1, wherein the rotor axis of rotation of each rotor is substantially parallel to the shaft axis of rotation.

3. The hybrid turbine engine as defined in claim 1, comprising an exhaust duct configured to channel the flow of combustion gas downstream of the turbine axially and radially outwardly relative to the shaft axis of rotation, an exterior of the exhaust duct defining a radially-inner space that is radially converging in a first direction along the shaft axis of rotation; wherein:
    the electric motor is at least partially disposed in the radially inner space defined by the exterior of the exhaust duct; and
    the drive gears are disposed farther in the first direction along the shaft axis of rotation than the rotors.

4. The hybrid turbine engine as defined in claim 3, wherein:
the turbine engine has a reverse-flow configuration where the exhaust duct is disposed forward of an air inlet of the turbine engine; and
the first direction along the shaft axis of rotation corresponds to an aft direction of the turbine engine.

5. The hybrid turbine engine as defined in claim 4, wherein the second radially inner interface is disposed axially forward of the radially outer interface.

6. The hybrid turbine engine as defined in claim 1, comprising a gearbox configured to transfer power from the turbine shaft to the load and to transfer power from the electric motor to the load, the electric motor being disposed axially between the gearbox and the turbine relative to the shaft axis of rotation.

7. The hybrid turbine engine as defined in claim 6, wherein the coupling device is configured to drivingly disengage the turbine shaft from the gearbox.

8. The hybrid turbine engine as defined in claim 7, wherein the electric motor is permanently drivingly engaged to the gearbox.

9. The hybrid turbine engine as defined in claim 1, wherein the electric motor is drivingly engaged to the load via:
the drive gears respectively drivingly engaged to the rotors;
the common gear drivingly engaged to the drive gears; and
a gearbox input shaft drivingly engaged to the common gear via the second radially inner interface.

10. The hybrid turbine engine as defined in claim 9, wherein the turbine shaft is drivingly engaged to the load via:
the common gear; and
the gearbox input shaft drivingly engaged to the common gear via the second radially inner interface.

11. The hybrid turbine engine as defined in claim 9, wherein the common gear is coupled for common rotation with the gearbox input shaft.

12. The hybrid turbine engine as defined in claim 1, wherein the electric motor is configured to be drivingly engaged to the common gear during the first mode of operation and during the second mode of operation.

13. The hybrid turbine engine as defined in claim 1, wherein the coupling device comprises a one-way clutch.

14. The hybrid turbine engine as defined in claim 1, wherein the gearbox input shaft and the turbine shaft are substantially coaxial.

15. The hybrid turbine engine as defined in claim 1, wherein the coupling device is axially disposed inside a central opening of the common gear.

* * * * *